United States Patent [19]
Westendorf et al.

[11] Patent Number: 5,161,295
[45] Date of Patent: Nov. 10, 1992

[54] FRICTION CLUTCH UNIT AND METHOD OF PRODUCING IT

[75] Inventors: Holger Westendorf, Dittelbrunn; Andreas Krause, Schonungen; Friedrich Kittel, Schweinfurt, all of Fed. Rep. of Germany

[73] Assignee: Fichtel & Sachs AG, Schweinfurt, Fed. Rep. of Germany

[21] Appl. No.: 695,618

[22] Filed: May 3, 1991

[30] Foreign Application Priority Data

May 7, 1990 [DE] Fed. Rep. of Germany ...... 4014470

[51] Int. Cl.⁵ .................. B23P 11/00; F16D 13/44
[52] U.S. Cl. ........................... 29/407; 29/434; 29/469; 29/505; 29/521; 29/525.2
[58] Field of Search .......... 29/407, 434, 469, 521, 29/524.1, 522.1, 525.2, 505; 192/70.25, 70.26, 70.27

[56] References Cited

U.S. PATENT DOCUMENTS

| | | |
|---|---|---|
| 4,427,101 | 1/1984 | Maucher et al. ............ 192/70.27 X |
| 4,600,092 | 7/1986 | Billett et al. . |
| 4,633,992 | 1/1987 | Ishida ................... 29/434 X |
| 4,783,895 | 11/1988 | Reik ..................... 29/434 |

FOREIGN PATENT DOCUMENTS

| | | |
|---|---|---|
| 1416552 | 11/1973 | United Kingdom . |
| 2125120 | 4/1980 | United Kingdom . |
| 2150652 | 10/1984 | United Kingdom . |
| 2180304 | 9/1985 | United Kingdom . |

Primary Examiner—Joseph Gorski
Attorney, Agent, or Firm—Anderson Kill Olick & Oshinsky

[57] ABSTRACT

The invention relates to a method of assembling a friction clutch, wherein the clutch housing is centered with a cylindrical portion on a cylindrical guide of the flywheel and the axially correct position is found by axial application and measurement of the initial tension of the clutch main spring and the clutch housing and flywheel are rigidly connected to one another in this state.

8 Claims, 3 Drawing Sheets

FRICTION CLUTCH UNIT AND METHOD OF PRODUCING IT

BACKGROUND OF THE INVENTION

The invention relates to a friction clutch unit and to a method of producing it.

A friction clutch and a method of assembling it is known from DE-A-3 343 506, in which the complete clutch is preassembled with a flywheel to form a module which can be fastened as complete unit on the crankshaft of an internal combustion engine, without involving complicated work.

With the known method of assembly, a pressure plate unit consisting of clutch housing, clutch main spring, optionally release elements, pressing plate with non-rotatable but axially movable connection to the clutch housing is firstly assembled and the pressure plate unit is then fastened with interposition of a clutch disc on the flywheel by bending the peripheral wall of the clutch housing round the flywheel The initial tension of the clutch main spring can be adjusted in limits by setting the bending force.

SUMMARY OF THE INVENTION

The present invention aims at providing a clutch unit in which the exact operating data, such as initial tension of the clutch main spring, can be adjusted exactly in the course of assembly, more simply and accurately than hitherto, independently of the tolerances of the individual components.

Owing to the axial movable guidance of the clutch housing with a cylindrical guide face on a cylindrical guide face of the flywheel or a component rigidly connected thereto and owing to the measurement of the axial force as they are pushed together, it is possible to determine the exact position of flywheel and clutch housing with respect to the tension of the clutch main spring and to produce a fastening in this position As the desired trend of the spring force is known, the initial tension can be determined exactly and can be set to its desired value during assembly.

It is expedient if the cylindrical guide face is formed by an annular face on the flywheel and by a cylindrical portion of the clutch housing which is placed with its internal diameter on the annular face. The annular face can be arranged directly on the external periphery of the flywheel Such a construction permits, for example, the simple arrangement of blind rivets distributed round the periphery in the flywheel, by means of which the clutch housing is fixed axially and peripherally. However, it is also possible to arrange, in the annular face of the flywheel, outwardly open recesses which are covered by the clutch housing and into which material of the cylindrical portion is deformed at least in part from the exterior by plastic deformation. Such a connection succeeds without further connecting elements The recesses can be designed in the form of blind holes or also in the form of an at least partially encircling groove.

A particularly simple connection between clutch housing and flywheel is possible if the cylindrical guide face is formed by an internal annular face which is arranged on the flywheel and into which a cylindrical end portion of the clutch housing penetrates at least in part, and the two parts are welded to one another. It is advantageous if the internal annular face as well as the cylindrical end portion are peripherally divided and extend only over individual sectors. A substantially negligible reaction by the welded joint on the attachment of the clutch main spring is achieved in this way.

However, it is also possible to form the annular face by a component placed on the flywheel. This can be provided, for example, in the form of a cast ring. The advantage arises that the material of the ring can be optimally adapted for a welded joint. However, it is also possible to design the gearwheel. For the starter such that it can be placed as a gear rim onto the flywheel and points with a projection in the direction of the clutch housing, the external contour of the projection forming the annular face for guiding the cylindrical projection of the clutch housing. An axial stop of the flywheel transmits the tension of the clutch main spring, and the fastening of the starter gearwheel is provided at the same time. A particularly inexpensive design can be achieved if the component is a gearwheel which is shaped from sheet metal and rests with an annular part on a vertical stop face of the flywheel pointing away from the clutch housing, projections which are angled axially from the annular part being placed on the external periphery of the flywheel and the external contour of the projections forming the annular fare. An unproblematical welded joint is thus produced between the clutch housing and the starter gearwheel shaped from sheet metal.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
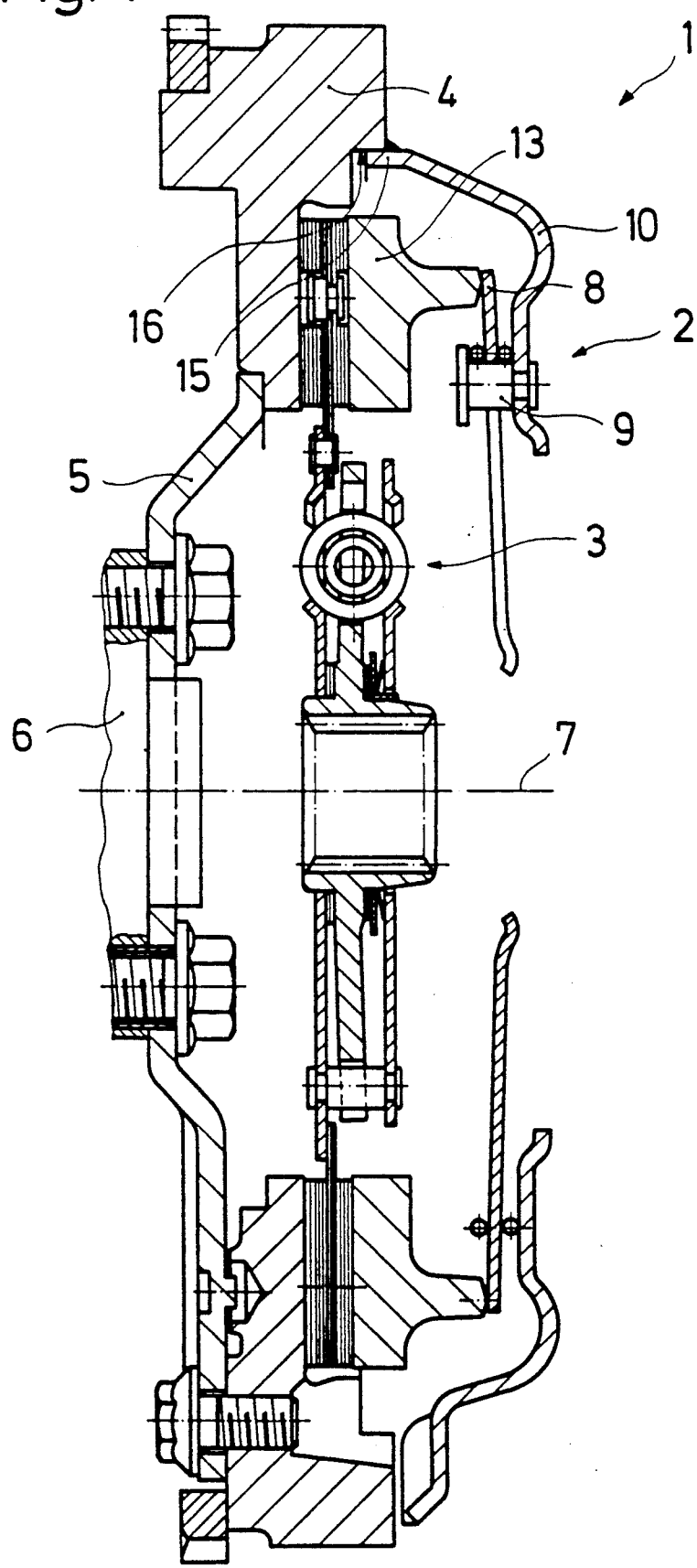
FIG. 1 is an axial longitudinal section through a clutch module.

FIG. 1 shows a friction clutch 1 comprising a pressure plate unit 2 with a clutch housing 10, a pressing plate 13 which is axially movably but non-rotatably fastened on the clutch housing 10, a diaphragm spring 8 which rests on the one hand on the housing 10 and on the other hand on the pressing plate 13, a plurality of spacer pins 9 which are distributed round the periphery and define the sweep circuit of the diaphragm spring 8 being arranged in the housing. It would also be possible directly to use a different spring and release lever at this point. The pressure plate unit is connected, together with a conventional clutch disc 3 which is clamped with its friction linings between a flywheel 4 and the pressing plate 13, to the flywheel 4 and this module is screwed, in the fitted state, on a carrier plate 5 fastened on a crankshaft 6 of the internal combustion engine The use of a clutch module is advantageous in that it can be preassembled and balanced as a complete unit and then merely has to be screwed on the carrier plate 5. The friction clutch is assembled as follows in the present case: the pressure plate unit 2 is preassembled as a subunit and, together with the clutch disc 3, is attached to the flywheel 4. The diaphragm spring 8 is in its relaxed position. The clutch housing 10 is introduced by means of an assembly device with its cylindrical end portion 15 into an internal annular face 16 of the flywheel 4 and is loaded against the axially supported flywheel 4. The diaphragm spring 8 is thus brought into its operating position. During insertion of the clutch housing 10 into the flywheel 4, the force required for this purpose is measured and, as the desired spring tension is known precisely, the connection between clutch housing 10 and flywheel 4 can be made by welding the two parts together once this spring tension is attained. This method of assembly ensures that—independently of tolerances of the individual parts—the diaphragm spring 8 is brought into its exactly correct position and the necessary spring force characteristic can be maintained—based on the new state of the clutch linings. FIG. 1 also shows the common axis of rotation 7, round which the crankshaft 6 as well as the complete friction clutch 1 rotate in operation. It can also be seen that the cylindrical end portion 15 and the internal annular face 16 are not designed in an encircling manner but only in sectors.

Figure 2:
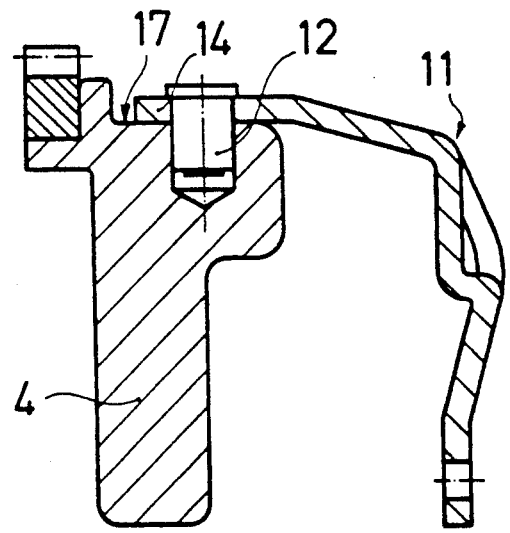

FIG. 2 shows details of a longitudinal section through a variation of a fastening region between a clutch housing 11 and the flywheel 4. In the present case, the clutch housing 11 is axially placed with a cylindrical portion 14 onto a correspondingly cylindrical external annular or guide face 17 of the flywheel 4 and is connected in the measured relative position by a plurality of peripherally distributed blind rivets 12. The bores and blind rivets can easily be introduced from radially outside through the clutch housing 11 into the flywheel 4.

Figure 3:
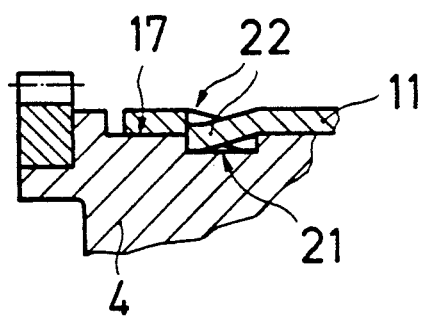
FIGS. 2 to 4 are partial longitudinal sections with fastening by plastic deformation and use of blind rivets.

According to FIG. 3, there is arranged from the exterior in the flywheel 4 in the annular or guide face 17 an encircling groove 21 into which tabs 22 of the clutch housing 11 are bent by plastic deformation using suitable dies, after connection to the clutch housing 11. A perfect axial connection is produced by alternate arrangement of these tabs 22. A non-rotatable anchorage can be produced if the groove 21 is not arranged in an encircling manner but is peripherally limited so that the tabs 22 can also form the non-rotatable connection.

Figure 4:
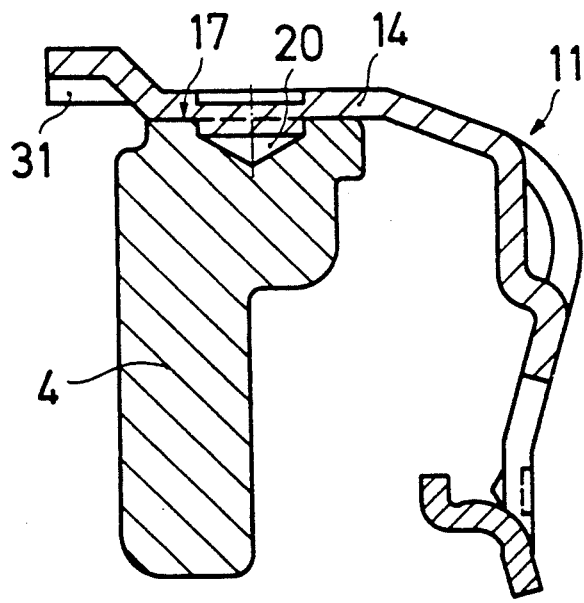

FIG. 4 shows a variation of FIG. 3 in which there is introduced radially from the exterior in the annular face 17 of the flywheel 4 a plurality of peripherally distributed blind holes 20 into which the material of the cylindrical portion 14 of the clutch housing 11 is deformed at least in part by dies having a circular cross section. This connection is at the same time axially rigid and also non-rotatable. In the illustration, a gearwheel 31 for the starter is simultaneously formed by an extension of the clutch housing 11 beyond the joint.

Figure 5:
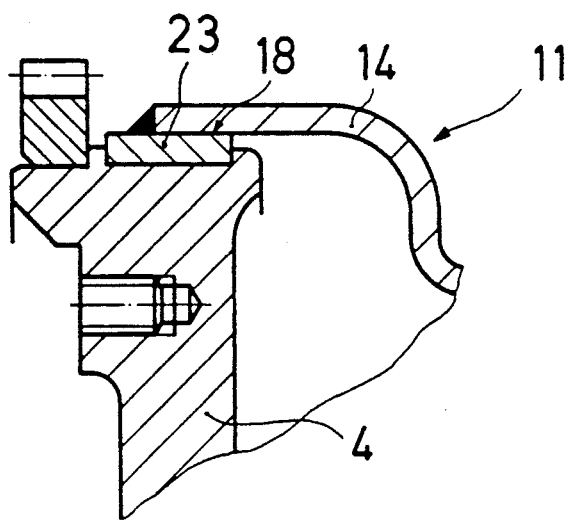
FIGS. 5 to 7 are partial longitudinal sections with fastening by a welded joint.

FIG. 5 shows a welded joint between clutch housing 11 and flywheel 4, a ring 23 being cast in the flywheel 4 and forming, with its external diameter, an annular face 18 onto which the cylindrical portion 14 of the clutch housing 11 is pushed. The arrangement of the ring 23 allows a simpler welded joint as the material composition of the ring 23 is selected with regard to a good welding capacity.

Figure 6:
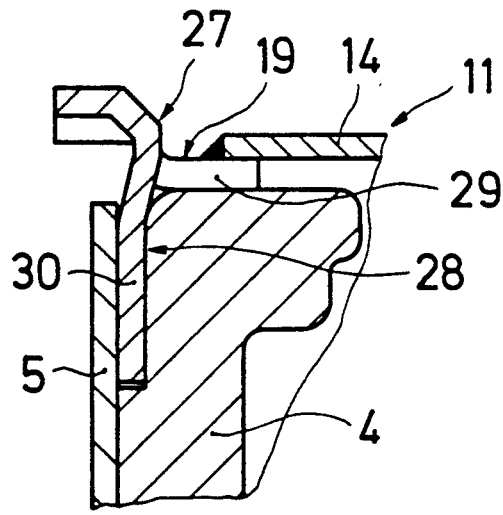

FIG. 6 shows an arrangement in which a gearwheel 27 shaped from sheet metal is placed from the crankshaft side onto the flywheel 4 and is fixed axially by a vertical stop face 28 and also via a plurality of peripherally distributed, axially exposed projections 29 in the radial direction relative to the flywheel 4. The external contour of the axial projections 29 forms a guide face 19 onto which the cylindrical portion 14 of the clutch housing 11 is axially pushed. A welded joint between the clutch housing 11 and the gearwheel 27 formed from sheet metal is also produced here.

Figure 7:
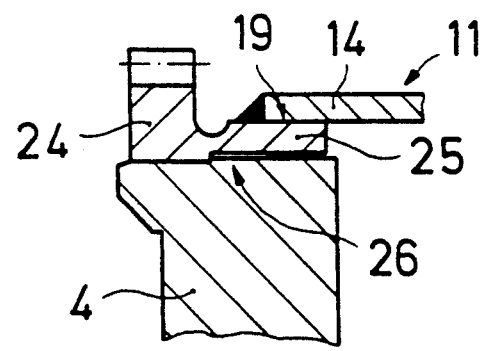

FIG. 7 shows a variation of FIG. 6, in which the gearwheel 24 is produced from solid material, is placed on the external periphery of the flywheel 4 and is axially secured by an axial stop 26, an axial projection 25 of the gearwheel 24 forming the guide face 19—for application of the cylindrical portion 14 of the clutch housing 11. A welded joint is also provided here.

While specific embodiments of the invention have been shown and described in detail to illustrate the application of the inventive principles, it will be understood that the invention may be embodied otherwise without departing from such principles.

What we claim is:

1. Method of assembling a friction clutch unit comprising a flywheel defining an axis of rotation, a clutch housing fastened on the flywheel, a processing plate non-rotatably but axially movably guided on the clutch housing, a clutch disc arranged with its friction linings, axially between the flywheel and the pressing plate and a clutch main spring system tensioning the pressing plate via the friction linings o the clutch disc against the flywheel, wherein one of the flywheel and a component rigidly connected o the flywheel and the clutch housing have adjacent axially extending guide faces having a cylindrical contour, at least in sectors, and center the flywheel and the clutch housing relative to one another, comprising the steps of:
   a) preassembling the clutch housing, the pressing plate and the clutch main spring system to form a pressure plate unit;
   b) placing the pressure plate unit and the clutch disc onto the flywheel;
   c) axially fastening the clutch housing on the flywheel;
   and measuring the pressing force of the clutch main spring system and adjusting the clutch housing to a predetermined value of the pressing force by axially displacing the clutch housing relative to the flywheel in step b), prior to fastening the flywheel and the clutch housing to one another in step c).

2. Method according to claim 1, wherein fastening the flywheel to the clutch housing includes fastening the clutch housing and the flywheel to one another in the region of the adjacent guide faces in step c).

3. Method according to claim 1, wherein fastening the clutch housing to the flywheel includes welding the clutch housing on one of the flywheel and the component rigidly connected to the flywheel.

4. Method according to claim 1, wherein fastening the clutch housing to the flywheel includes impressing by plastic deformation material of a wall portion of the clutch housing forming the cylindrical guide face into prefabricated cavities in the flywheel.

5. Method according to claim 4, wherein fastening the clutch housing o the flywheel includes designing the cavities in the flywheel as radial blind holes and pressing the material into the blind holes using a die having a circular cross section.

6. Method according to claim 1, wherein fastening the clutch housing to the flywheel includes stamping substantially U-shaped tabs radially from a wall portion of the clutch housing forming the cylindrical guide face and bending the tabs into prefabricated cavities of the flywheel.

7. Method according to claim 6, wherein fastening the clutch housing to the flywheel includes designing the cavities as a groove extending at least in portions along a periphery of the flywheel and shaping the tabs such that they protrude axially alternately in opposite directions.

8. Method according o claim 1, wherein fastening the clutch housing to the flywheel includes drilling holes radially into the flywheel through a wall portion of the clutch housing forming the cylindrical guide face, and inserting blind rivets into the holes.

* * * * *